United States Patent
Jaegle et al.

(10) Patent No.: US 9,683,519 B2
(45) Date of Patent: Jun. 20, 2017

(54) GAS INJECTOR FOR THE DIRECT INJECTION OF GASEOUS FUEL INTO A COMBUSTION CHAMBER

(71) Applicant: Robert Bosch GmbH, Stuttgart (DE)

(72) Inventors: Felix Jaegle, Ditzingen (DE); Olaf Ohlhafer, Erligheim (DE); Joerg Schoefer, Gerlingen (DE); Robert Giezendanner-Thoben, Gerlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 218 days.

(21) Appl. No.: 14/599,112

(22) Filed: Jan. 16, 2015

(65) Prior Publication Data
US 2015/0204276 A1  Jul. 23, 2015

(30) Foreign Application Priority Data
Jan. 17, 2014 (DE) .................. 10 2014 200 757

(51) Int. Cl.
| | | |
|---|---|---|
| *F02M 1/00* | (2006.01) | |
| *F02M 21/02* | (2006.01) | |
| *F02M 45/08* | (2006.01) | |
| *F02M 45/12* | (2006.01) | |

(52) U.S. Cl.
CPC .... *F02M 21/0275* (2013.01); *F02M 21/0263* (2013.01); *F02M 21/0269* (2013.01); *F02M 45/08* (2013.01); *F02M 45/12* (2013.01); *Y02T 10/32* (2013.01)

(58) Field of Classification Search
CPC ..... F02B 7/00; F02D 41/30; F02D 2041/2055
USPC ........ 123/294, 445, 490; 239/408, 432, 433, 239/533.7, 585.1
See application file for complete search history.

(56) References Cited

U.S. PATENT DOCUMENTS

| | | | | |
|---|---|---|---|---|
| 4,350,301 | A * | 9/1982 | Erwin | F02M 61/08 239/453 |
| 5,172,865 | A * | 12/1992 | Takano | F02M 69/08 123/531 |
| 6,089,467 | A * | 7/2000 | Fochtman | F02M 51/0614 239/5 |
| 6,382,083 | B2 * | 5/2002 | Schmed | F16D 25/088 92/168 |
| 8,291,981 | B2 * | 10/2012 | Tveiten | E21B 43/123 166/321 |
| 2005/0263622 | A1 * | 12/2005 | Schlairet | F02M 57/023 239/533.2 |
| 2006/0255185 | A1 * | 11/2006 | Cristiani | F02M 51/0671 239/533.7 |

(Continued)

FOREIGN PATENT DOCUMENTS

DE   10 061 571   6/2002

*Primary Examiner* — John Kwon
(74) *Attorney, Agent, or Firm* — Gerard Messina

(57) ABSTRACT

A gas injector for the direct injection of gaseous fuel into a combustion chamber of an internal combustion engine, which includes a valve seat, a valve needle having a sealing region, the valve needle releasing a first cross-sectional area at the valve seat in response to a lift, a component surrounding the valve needle, and a gas control region, which is situated directly next to the sealing region, the gas control region providing a constant cross-sectional area between the valve needle and the component surrounding the valve needle across a lift length from a first lift position to a second lift position.

12 Claims, 2 Drawing Sheets

(56) References Cited

U.S. PATENT DOCUMENTS

2015/0204275 A1\* 7/2015 Jaegle ................ F02M 21/0263
123/294

\* cited by examiner

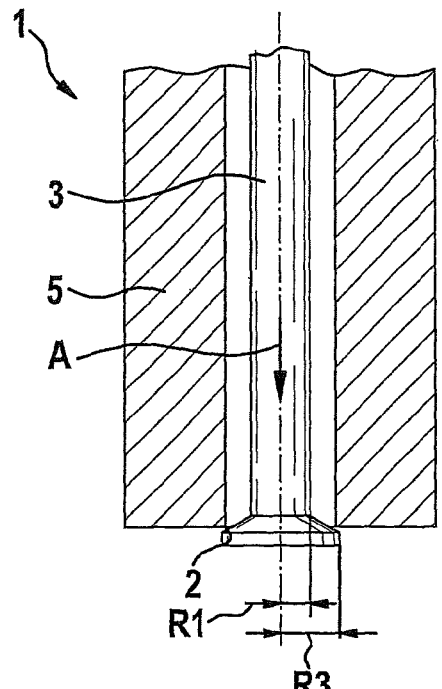
RELATED ART Fig. 1
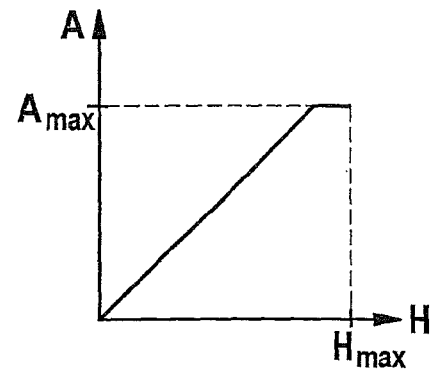
RELATED ART Fig. 2
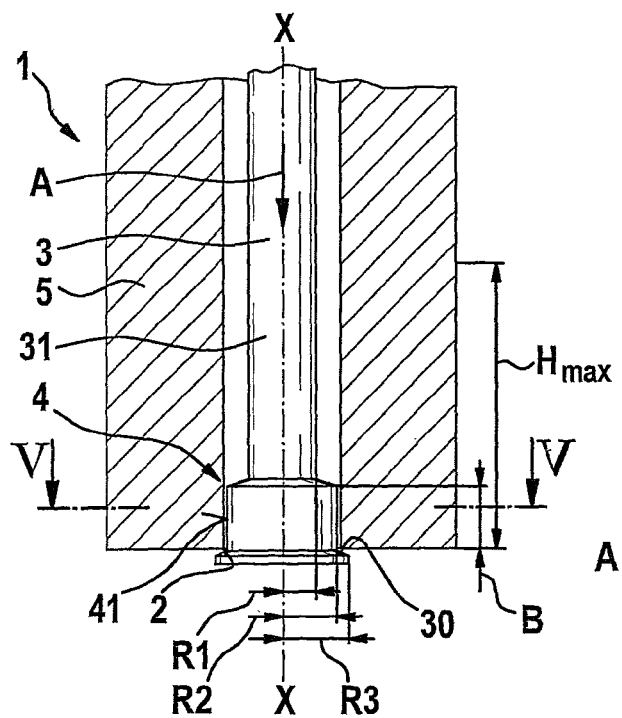
Fig. 3
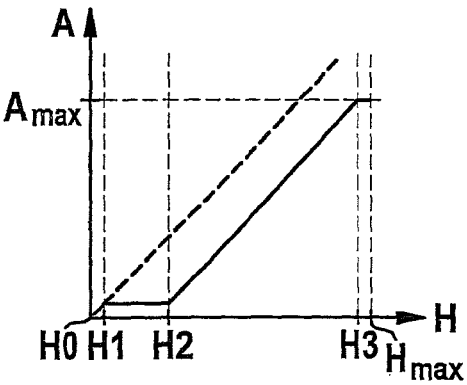
Fig. 4

GAS INJECTOR FOR THE DIRECT INJECTION OF GASEOUS FUEL INTO A COMBUSTION CHAMBER

RELATED APPLICATION INFORMATION

The present application claims priority to and the benefit of German patent application no. 10 2014 200 757.7, which was filed in Germany on Jan. 17, 2014, the disclosure of which is incorporated herein by reference.

FIELD OF THE INVENTION

The present invention relates to a gas direct injector for the direct injection of gaseous fuel, such as natural gas, into a combustion chamber of an internal combustion engine.

BACKGROUND INFORMATION

Apart from the frequently used liquid fuels, the use of gaseous fuels, such as natural gas or hydrogen, has been increasing over the past few years. However, the known injectors for liquid fuels are only conditionally suitable for such gaseous fuels, since gaseous fuels have different energy densities and volumes than liquid fuels. To ensure that internal combustion engines operated in this manner do not consume too much fuel, it is necessary to inject the most precise gas quantities possible in each injection. In the future, to save fuel, it will also be necessary to handle one or more injection process(es) per combustion cycle. Apart from the requirement of injecting a certain maximum quantity within a predefined period of time, it must also be possible to meter defined minimal gas quantities in a precise manner. The gas injector also needs to seal with respect to the combustion chamber between different injections. FIG. 1 schematically illustrates an example of a known gas injector, in which an outwardly opening valve needle 3 sits on a valve seat 2 inside a housing 5. FIG. 1 shows the closed state of the injector. FIG. 2 schematically shows a diagram of a characteristic of the effective overall opening cross-section A across lift H. Here, a linear characteristic comes about both for smaller lifts and for large lifts H, as long as the released annular cross-sectional area at the valve needle constitutes the smallest cross-section. A constant cross-sectional area $A_{max}$, which is independent of lift H, therefore results as soon as the annular gap between nozzle needle 3 having radius R1 and the outer contour (radius R3 at valve seat 2) of the gas supply of the injector constitutes the smallest cross-section. For this reason the curve in the diagram of FIG. 2 is horizontal up to maximum lift $H_{max}$ in the end region.

A conflict in goals between the metering of minimal quantities and a maximally desired quantity per injection cycle exists in the configuration of gas injectors. Because of the relatively low density of gaseous fuels, great volumes must be injected within a short period of time at space requirements that are comparable to an injector for liquid fuels. To do so, a gas injector should be able to release large cross-sections as rapidly as possible at a given lift. The concept of the gas injector shown in FIGS. 1 and 2 has the steepest possible cross-sectional characteristic across the lift. However, this makes it difficult to meter minimal quantities, and multiple injections, in particular, are impossible to realize.

SUMMARY OF THE INVENTION

In contrast, the gas injector according to the present invention for the direct injection of gaseous fuel into a combustion chamber of an internal combustion engine and having the features described herein has the advantage that even minimal gas quantities can be metered without any problems. In particular a multi-injection of fuel during an injection cycle is also realizable in this manner. In the present invention, this is achieved by providing a gas control region at a valve needle, which is situated in the immediate vicinity of a sealing region at the valve needle. The sealing region of the valve needle is the region that provides sealing together with a valve seat of the gas injector when the gas injector is closed. The sealing region of the valve needle may be a conical region. In an opening operation of the gas injector the valve needle executes a lift, so that a first cross-sectional area is released at the valve seat. Across a lift length from a first lift position to a second lift position, the gas control region at the valve needle provides a constant first cross-sectional area. The first cross-sectional area is defined perpendicularly to an axial direction of the gas injector, between a valve needle and a component that surrounds the valve needle, especially a housing of the gas injector. As a result, a first cross-sectional area, through which the gaseous fuel must flow, is able to be defined by the choice of a geometry at the gas control region, which is situated directly next to the sealing region of the valve needle. This makes it possible to control small gas quantities, in particular. The lift length between the first and the second lift position is markedly smaller than a maximum lift of the valve needle, but is selected in such a way that multiple injections in particular are possible, the multiple injections may have only lift lengths that lie in the region between the first and second lift position. As a result, it is possible to meter minute gas quantities in a micro-control range in a precise manner, regardless of the precision of a lift position.

The further developments of the present invention are also described herein.

To ensure an especially uncomplicated and cost-effective manufacturability of the gas injector, the gas control region at the valve needle may be cylindrical. This makes it possible to provide the first cross-sectional area in the form of an annular gap in a simple and cost-effective manner.

Furthermore, the gas control region at the valve needle may have one flattened region, and may have more, at the outer circumference. The flattened regions especially may be situated opposite each other along the periphery of the gas control region. Furthermore, a total of precisely four flattened regions may be provided. According to an alternative development of the present invention, the gas control region at the valve needle may have multiple recesses that run in the axial direction. The recesses may have an angular cross-section.

Moreover, the gas control region at the valve needle may have a plurality of through openings, which extend in the axial direction of the gas injector. The through openings may be cylindrical. In addition, the system of through openings is also disposed symmetrically along the periphery.

According to a further development of the present invention, the component surrounding the valve needle, with which the valve needle defines the first cross-sectional area, has an inner cylinder region.

A lift length between the first lift position and the second lift position may amount to maximally one third of the overall lift of the valve needle. In this way it can be ensured that a large maximum gas injection is still possible at the beginning of the lift of the valve needle, the presence of the gas control region notwithstanding.

Moreover, the valve needle may have a guide region for guiding the valve needle at the gas control region. The gas control region can consequently assume a second function, i.e., a guide function for the valve needle. The guidance may be accomplished with the aid of the cylindrical outer lateral surface of the valve needle at the gas control region.

The present invention furthermore relates to a gas-operated internal combustion engine, which includes a gas injector according to the present invention.

Exemplary embodiments of the present invention are described in detail below, with reference to the accompanying drawing. Identical or functionally equivalent parts are designated by the same reference numerals.

BRIEF DESCRIPTION OF THE DRAWINGS

FIG. 1 shows a schematic sectional view of a gas injector according to the related art.

FIG. 2 shows a diagram, which represents an effective cross-sectional area A at the valve seat that opens in response to a lift H of a valve needle of the gas injector, according to the related art.

FIG. 3 shows a schematic sectional view of a gas injector according to a first exemplary embodiment of the present invention, in the closed state.

FIG. 4 shows a schematic illustration of a diagram which shows the effective opening area A across a lift H of the valve needle in the first exemplary embodiment.

DETAILED DESCRIPTION

Figure 5:
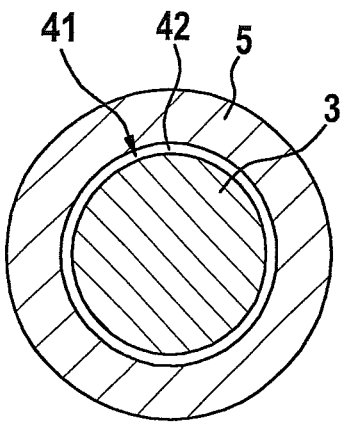
FIG. 5 shows a schematic sectional view along line V-V of FIG. 3.

In the following text, a gas injector 1 according to a first exemplary embodiment of the present invention will be described in detail with reference to FIGS. 3 through 5.

Gas injector 1, schematically illustrated in FIG. 3, includes a valve needle 3, which seals at a valve seat 2 that is configured on a housing 5. Valve seat 2 has a radius R3.

In addition, gas injector 1 includes an inner gas control region 4, which is situated directly next to a sealing region 30 provided on valve needle 3. Sealing region 30 has a conical shape and in the closed state forms a circular line seal together with valve seat 2. Gas control region 4 includes a cylindrical lateral region 41, which extends parallel to an axial direction X-X of the gas injector. Cylindrical lateral region 41 has a height B in the axial direction, which corresponds to a lift between a first lift position H1 and a second lift position H2.

Housing 5 includes an inner lateral region 51, which is cylindrical as well. This creates an annular gap 42 between inner lateral region 51 of housing 5 and cylindrical lateral region 41 at gas control region 4. Annular gap 42 can be gathered from FIG. 5, in particular.

In an opening operation, conical sealing region 30 of valve needle 3 initially lifts off from annular valve seat 2 and thereby releases a small, negligible cross-sectional area. Until lift position H1 is reached, the small cross-sectional area enlarges in a linear fashion, which is illustrated in FIG. 1 by the curve component between zero point H0 and lift H1. In the further lift characteristic, valve needle 3 continues its movement in the direction of arrow A; however, in this case the effective cross-sectional area A is then defined by annular gap 42. Annular gap 42 provides a constant first cross-sectional area between first lift position H1 and second lift position H2. In FIG. 3, axial height B of cylindrical lateral surface 41 has been schematically plotted in axial direction X-X. Maximum lift height $H_{max}$ has been entered in addition.

As soon as valve needle 3 has passed second lift position H2, the effective cross-sectional area for the injection of the gaseous fuel into a combustion chamber of an internal combustion engine continues to increase again at a constant gradient, until a third lift position H3 is reached. As illustrated in FIG. 4, effective cross-section A no longer enlarges further starting with third lift position H3, since a constant cross-section, defined by valve seat 2 and thinner valve needle component 31, having radius R1 is at the open injector exit.

The provision of gas control region 4 directly next to sealing region 30 of valve needle 3 results in an especially simple configuration of the gas injector, as can be gathered directly from FIG. 3. The gas injector, and especially valve needle 3, are able to be produced in a particularly cost-effective manner. By providing gas control region 4 at valve needle 3, it is possible to make available a micro-control region for minimal gas quantities, which injects only small gas quantities into the combustion chamber up to a lift length H2, by the provision of a constant, small effective cross-section A. As a result, the precise metering of gas quantities even at small lifts is possible, up to a lift position H2, independently of the precision of the lift position, so that a multi-injection, in particular, is possible as well with the aid of the gas injector according to the present invention.

Nevertheless, starting at a predefined lift length H2, an injection quantity of sufficient size for gaseous fuels is able to be provided. The gas injector according to the present invention therefore also satisfies the requirement of releasing large cross-sections as rapidly as possible so that large fuel gas quantities are able to be injected into the combustion chamber.

Figure 6:
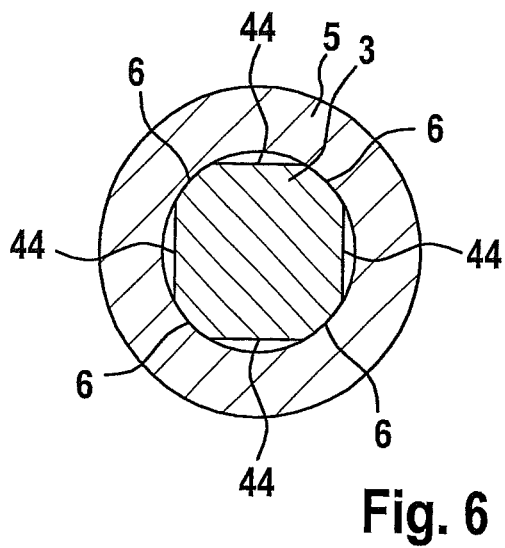
FIGS. 6, 7 and 8 show schematic sectional views of alternative exemplary embodiments of a gas injector.
Figure 7:
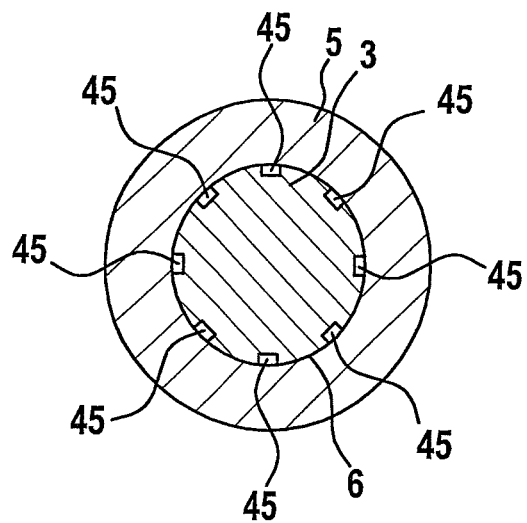
Figure 8:
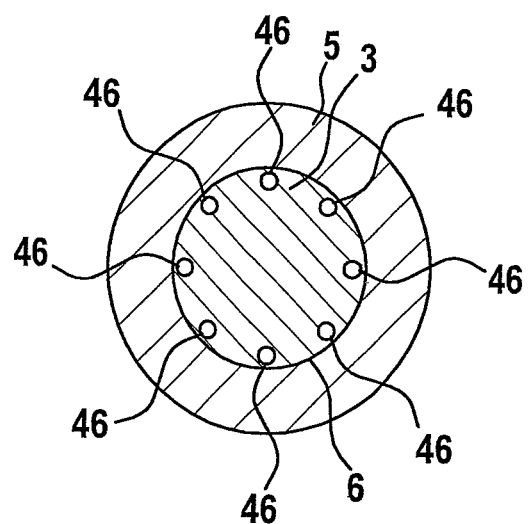

FIGS. 6 through 8 show alternative developments of gas control region 4. In the exemplary embodiment shown in FIG. 6, for example, four planar side surfaces 44 are provided, which define the flow rate in the region of the lift between lift positions H1 and H2. Two planar side surfaces 44 are situated across from each other at the periphery of valve needle 3 in each case. Reference numeral 6 designates a guide region of the valve needle.

In the exemplary embodiment shown in FIG. 7, a multitude of angular recesses 45 is provided at the outer periphery of gas control region 4 of valve needle 3. Angular recesses 45 extend across the entire length of gas control region 4 in the axial direction X-X and provide the first cross-sectional area.

In the exemplary embodiment shown in FIG. 8, a multitude of cylindrical axial through openings 46 exists in gas control region 4. Through openings 46 provide the first cross-section.

In connection with the exemplary embodiments shown in FIGS. 6 through 8, it should be pointed out that they additionally also include guide regions 6 at the outer periphery of the valve needle in gas control region 4 where valve needle 3 is guided inside housing 5. This enables gas control region 4 to also assume a guide function of valve needle 3 apart from defining the second cross-sectional area.

The present invention therefore allows a multi-stage injection of gaseous fuel and, in particular, also exact metering of minimal gas quantities for certain states of the internal combustion engine.

What is claimed is:

1. A gas injector for directly injecting gaseous fuel into a combustion chamber of an internal combustion engine, comprising:
   a valve seat;
   a valve needle having a sealing region, the valve needle releasing a first cross-sectional area at the valve seat in response to a lift;
   a component surrounding the valve needle; and
   a gas control region, which is situated at the valve needle directly next to the sealing region;
   wherein the gas control region provides a constant cross-sectional area between the valve needle and the component surrounding the valve needle across a lift length from a first lift position to a second lift position, wherein the valve needle provides a second cross-sectional area that is larger than the constant cross-sectional area at a lift length greater than the second lift position.

2. The injector of claim 1, wherein the gas control region is cylindrical.

3. The injector of claim 2, wherein the gas control region has at least one flattened region at the outer periphery.

4. The injector of claim 2, wherein the gas control region has multiple recesses running in the axial direction.

5. The injector of claim 1, wherein the gas control region has multiple through openings running in the axial direction.

6. The injector of claim 1, wherein the component surrounding the valve needle has an inner cylinder region and the cross-sectional area is an annular gap.

7. The injector of claim 1, wherein the lift length from the first lift position to the second lift position amounts to maximally one third of an overall lift, wherein the overall lift is between a starting position when the valve needle is engaged with the valve seat and an end position that represents a position along an axis of the injector of maximal displacement of the valve needle from the valve seat.

8. The injector of claim 1, wherein the valve needle at the gas control region includes a guide region.

9. The injector of claim 2, wherein the gas control region has multiple flattened regions at the outer periphery.

10. A gas-operated internal combustion engine, comprising:
    a gas injector for directly injecting gaseous fuel into a combustion chamber, including:
    a valve seat;
    a valve needle having a sealing region, the valve needle releasing a first cross-sectional area at the valve seat in response to a lift;
    a component surrounding the valve needle; and
    a gas control region, which is situated at the valve needle directly next to the sealing region;
    wherein the gas control region provides a constant cross-sectional area between the valve needle and the component surrounding the valve needle across a lift length from a first lift position to a second lift position, and wherein the valve needle provides a second cross-sectional area that is larger than the constant cross-sectional area at a lift length greater than the second lift position.

11. The injector of claim 1, wherein a radius of the gas control region is larger than a radius of a region of the valve needle above the gas control region.

12. The gas-operated internal combustion engine of claim 10, wherein a radius of the gas control region is larger than a radius of a region of the valve needle above the gas control region.

\* \* \* \* \*